United States Patent
Kuo et al.

(10) Patent No.: US 8,368,841 B2
(45) Date of Patent: Feb. 5, 2013

(54) BACKLIGHT MODULE AND LIQUID CRYSTAL DISPLAY COMPRISING A LIGHT GUIDE PLATE WITH FIRST, SECOND, THIRD MICROSTRUCTURES, AND A PLURALITY OF PILLARS

(75) Inventors: Hao-Jan Kuo, Hsin-Chu (TW); Ming-Dah Liu, Hsin-Chu (TW)

(73) Assignee: Coretronic Corporation (TW)

( * ) Notice: Subject to any disclaimer, the term of this patent is extended or adjusted under 35 U.S.C. 154(b) by 383 days.

(21) Appl. No.: 12/588,282

(22) Filed: Oct. 9, 2009

(65) Prior Publication Data

US 2010/0103345 A1  Apr. 29, 2010

(30) Foreign Application Priority Data

Oct. 27, 2008  (TW) ................ 97141125 A (51) Int. Cl.
  *G02F 1/1335*  (2006.01)
  *G09F 13/04*  (2006.01)
(52) U.S. Cl. ........................ 349/65; 362/97.2
(58) Field of Classification Search .......... 349/61–65; 362/97.1–97.4, 608, 620–622, 626
  See application file for complete search history.

(56) References Cited

U.S. PATENT DOCUMENTS

| | | | |
|---|---|---|---|
| 2003/0099117 A1* | 5/2003 | Nakaoka et al. | 362/561 |
| 2003/0160911 A1* | 8/2003 | Kano | 349/65 |
| 2008/0278659 A1* | 11/2008 | Park | 349/65 |
| 2009/0046480 A1* | 2/2009 | Chen et al. | 362/617 |

FOREIGN PATENT DOCUMENTS

| | | |
|---|---|---|
| CN | 1576910 A | 2/2005 |
| CN | 1914460 A | 2/2007 |
| JP | 2005216665 A | 8/2005 |
| JP | 2005285704 A | 10/2005 |
| TW | 200909894 | 8/1996 |
| TW | 200722852 A | 6/2007 |

OTHER PUBLICATIONS

SIPO Office Action dated Apr. 15, 2011.
TIPO Office Action dated Feb. 22, 2012 (including English translation) 10 pages.
SIPO Office Action dated Feb. 20, 2012; Chinese Application No. 200810176745.8.

\* cited by examiner

*Primary Examiner* — Edward Glick
*Assistant Examiner* — Paul Lee
(74) *Attorney, Agent, or Firm* — MH2 Technology Law Group LLP (57) ABSTRACT

A backlight module includes at least one point light source and a light guide plate. The light guide plate includes a light emitting surface, a bottom surface, a light incident surface, a first side surface, a second side surface, a first microstructure, and a second microstructure. The bottom surface is opposite to the light emitting surface, the light incident surface connects the light emitting surface and the bottom surface, the point light source is disposed adjacent to the light incident surface, and the first microstructure is formed on the light incident surface. The first side surface is opposite to the light incident surface and connects the light emitting surface and the bottom surface, and the second side surface connects the light emitting surface, the bottom surface, the light incident surface, and the first side surface. The second microstructure is formed on the second side surface.

15 Claims, 7 Drawing Sheets

BACKLIGHT MODULE AND LIQUID CRYSTAL DISPLAY COMPRISING A LIGHT GUIDE PLATE WITH FIRST, SECOND, THIRD MICROSTRUCTURES, AND A PLURALITY OF PILLARS

CROSS-REFERENCE TO RELATED APPLICATION

This application claims the priority benefit of Taiwan application serial no. 97141125, filed on Oct. 27, 2008. The entirety of the above-mentioned patent application is hereby incorporated by reference herein and made a part of this specification.

BACKGROUND OF THE INVENTION

1. Field of the Invention

The present invention relates to a backlight module and a liquid crystal display including the backlight module.

2. Description of Prior Art

Figure 1:
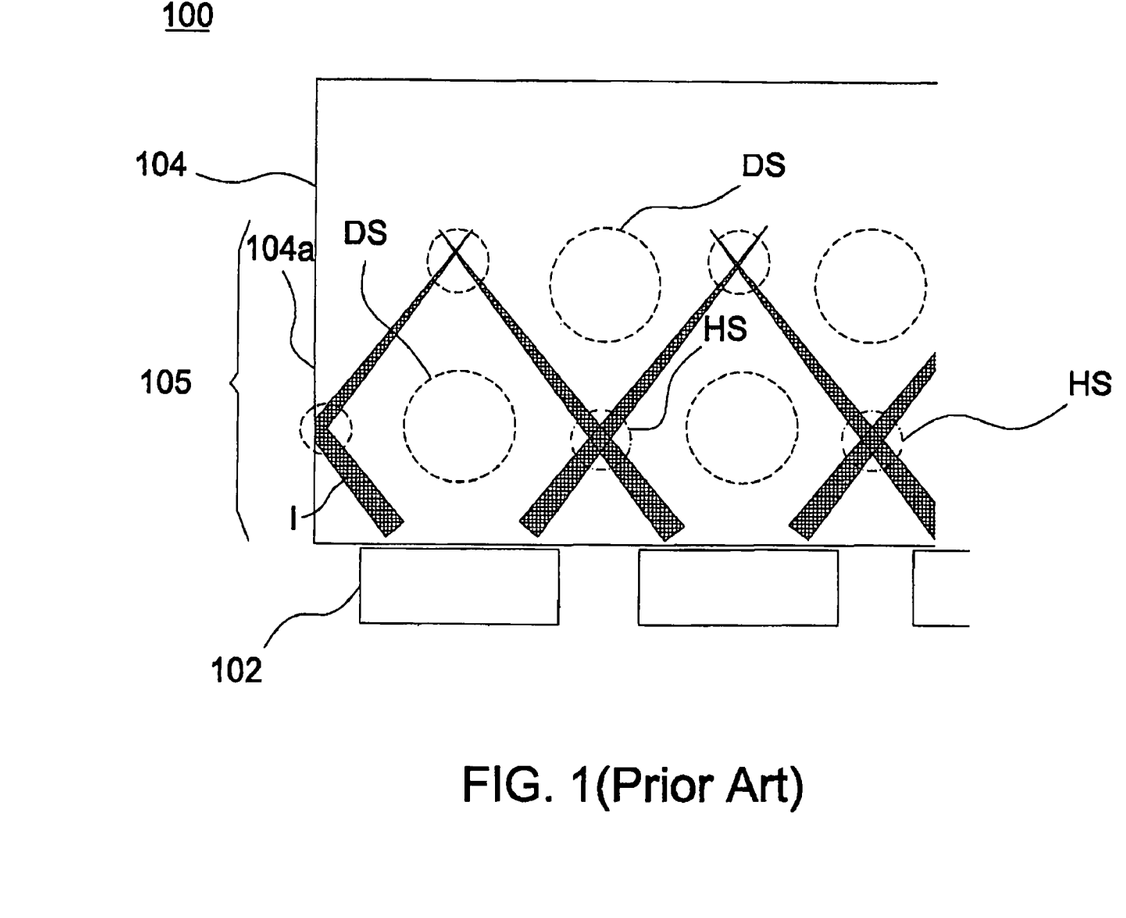
FIG. 1 is a schematic view of a conventional backlight module using a point light source as a side light source.
Figure 2:
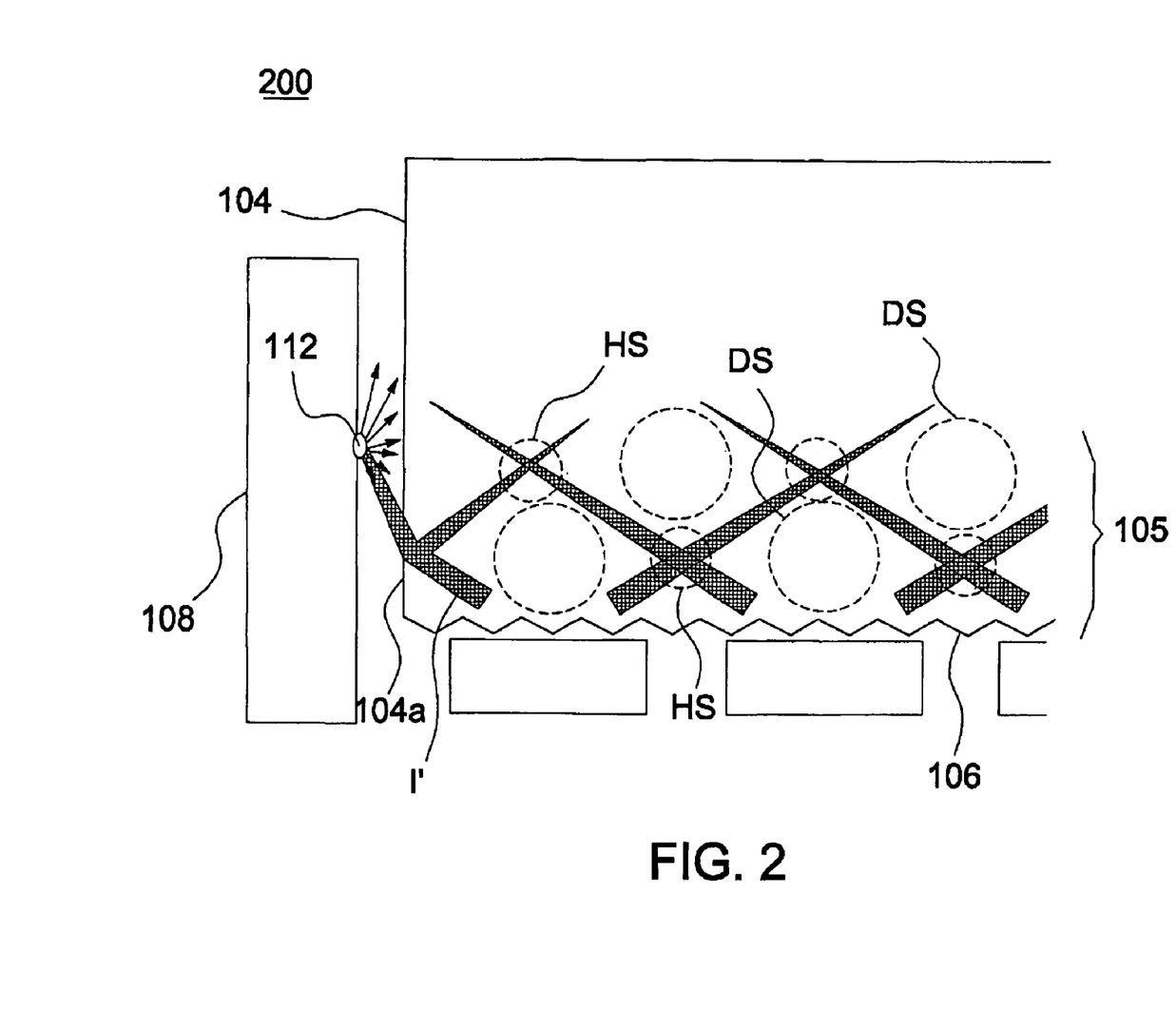
FIG. 2 is a schematic view of another conventional backlight module using a point light source as a side light source.

FIG. 1 is a schematic view of a conventional backlight module 100 using a point light source as a side light source. Referring to FIG. 1, when the point light source 102 (for example a light emitting diode) is used as the side light source, the front end of the light guide plate 104 may generate a hot spot HS and a dark spot DS distributed alternately base on the light emitting characteristic of the point light source 102. Therefore, there is a need to reserve a large light mixing region 105 for uniformly diffusing the light energy, and this may reduce the effective uniformity light emitting region of the light guide plate 104 greatly. To solve the problem, as shown in FIG. 2, in another conventional backlight module 200 design, the microstructure 106 may be disposed on the light incident side of the light guide plate 104 and the light beam through the microstructure 106 may increase a deflection angle of the incident light beam, so as to form the hot spot HS on the region of the light guide plate adjacent to the light incident side and thus effectively reduce the area of the light mixing region 105. Referring to FIG. 1, the side light beam I may be originally reflected into the light guide plate 104 by the side of the light guide plate 104a, and referring to FIG. 2, after the deflection angle of the incident light beam is increased by the light diffusing effect of the microstructure 106, a part of the side light beam I' may be refracted out of the light guide plate 104, so as to reduce the light utilization efficiency. In addition, when the part of the side light beam I' refracted out of the light guide plate 104 may encounter outside structure, for example the frame 108 having reflective material with the matt surface, the part of the side light beam I' may be reflected by the surface of the frame 108, so as to form the obvious side hot spot 112.

SUMMARY OF THE INVENTION

The present invention is directed to a backlight module and a liquid crystal display, capable of avoiding generating the side hot spot in the backlight module and having a good light utilization efficiency.

An embodiment of the present invention provides a backlight module including at least one point light source and a light guide plate. The light guide plate includes a light emitting surface, a bottom surface, a light incident surface, a first side surface, a second side surface, a first microstructure, and a second microstructure. The bottom surface is opposite to the light emitting surface, the light incident surface connects the light emitting surface and the bottom surface, the point light source is disposed adjacent to the light incident surface, and the first microstructure is formed on the light incident surface. The first side surface is opposite to the light incident surface and connects the light emitting surface and the bottom surface. The second side surface connects the light emitting surface, the bottom surface, the light incident surface, and the first side surface. The second microstructure is formed on the second side surface for reflecting a light beam incident on the second side surface into the light guide plate.

In an embodiment of the present invention, the second microstructure includes a plurality of pillars protrusive from the second side surface. Each of the pillars has a first inclined plane and a second inclined plane connecting the first inclined plane, the light incident surface is closer to the first inclined plane than to the second inclined plane, and the length of the first inclined plane is greater than the length of the second inclined plane.

In an embodiment of the present invention, the angle between the first inclined plane and the second side surface is great than or equal to 10 degrees and less than or equal to 30 degrees, and the projection length of each of the pillars on the second side surface is great than or equal to 100 micrometers and less than or equal to 400 micrometers.

In an embodiment of the present invention, each of the pillars has an arc surface for reflecting a light beam incident on the arc surface into the light guide plate.

To achieve one of, a part of or all of the above-mentioned advantages, an embodiment of the present invention provides a liquid crystal display including a liquid crystal display panel and the above-backlight plate. The backlight module is disposed at one side of the liquid crystal display panel and is adapted to provide a surface light source for the liquid crystal display panel and the light emitting surface of the light guide plate of the backlight module is towards the liquid crystal display panel.

Based on the above design of each of the embodiments described, when the side light beam having the large angle deflected by the microstructure of the light incident surface is incident into a side of the light guide plate, the side light beam encountering the microstructure formed on the second side surface may satisfy total internal reflection condition and may be reflected into the light guide plate, so as to avoid refracting the side light beam out of the light guide plate and thus preventing forming the side hot spot. In addition, reflecting the side light beam into the light guide plate may enhance the light utilization efficiency.

Other objectives, features and advantages of the present invention will be further understood from the further technological features disclosed by the embodiments of the present invention wherein there are shown and described preferred embodiments of this invention, simply by way of illustration of modes best suited to carry out the invention.

DETAILED DESCRIPTION OF THE PREFERRED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 3:
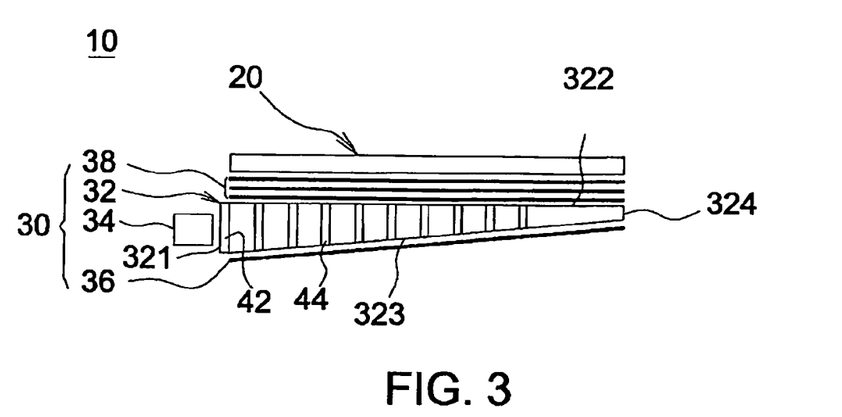
FIG. 3 is a schematic side view of a liquid crystal display in an embodiment of the present invention.
Figure 4:
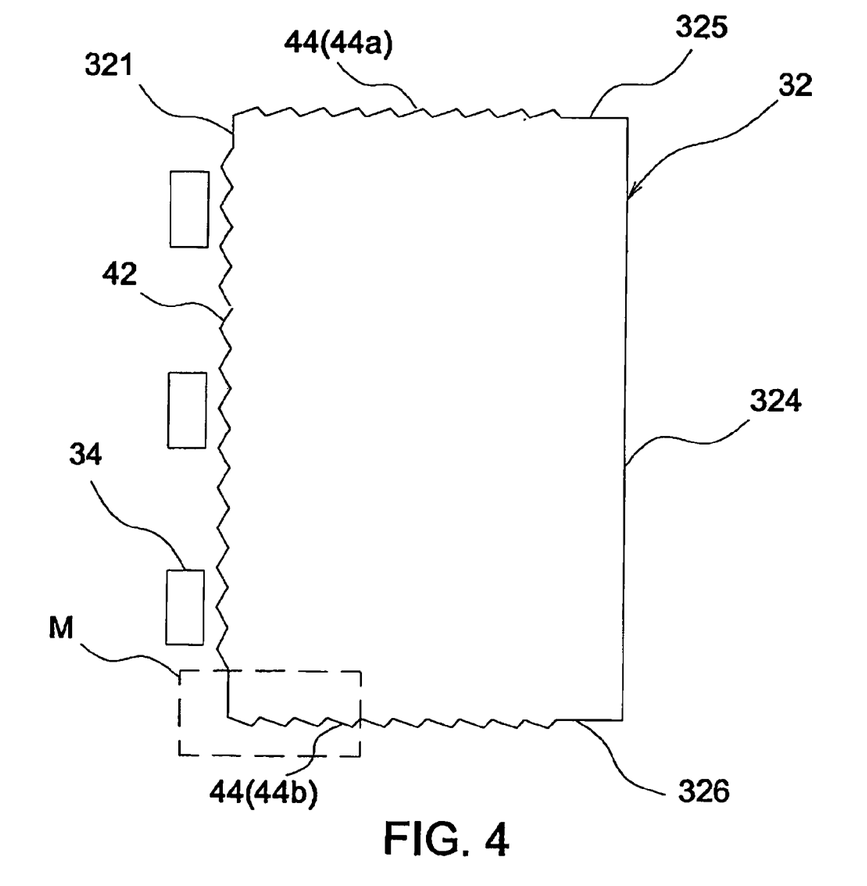
FIG. 4 is a schematic top view of part components of the backlight module in FIG. 3.

FIG. 3 is a schematic side view of a liquid crystal display in an embodiment of the present invention, and FIG. 4 is a schematic top view of part components of the backlight module in FIG. 3. Referring to FIG. 3 and FIG. 4, the liquid crystal display 10 includes a liquid crystal display panel 20 and a backlight module 30. The backlight module 30 is, for example, a side type backlight module. The backlight module 30 is disposed at one side of the liquid crystal display panel 20 and adapted to provide a surface light source for the liquid crystal display panel 20. The backlight module 30 includes a light guide plate 32 and at least one point light source 34. In the embodiment, the light guide plate 32 is a wedge light guide plate, and that is not so limited. The light guide plate 32 may be a flat light guide plate. Furthermore, the point light source 34 is, for example, a light emitting diode (LED).

Figure 5:
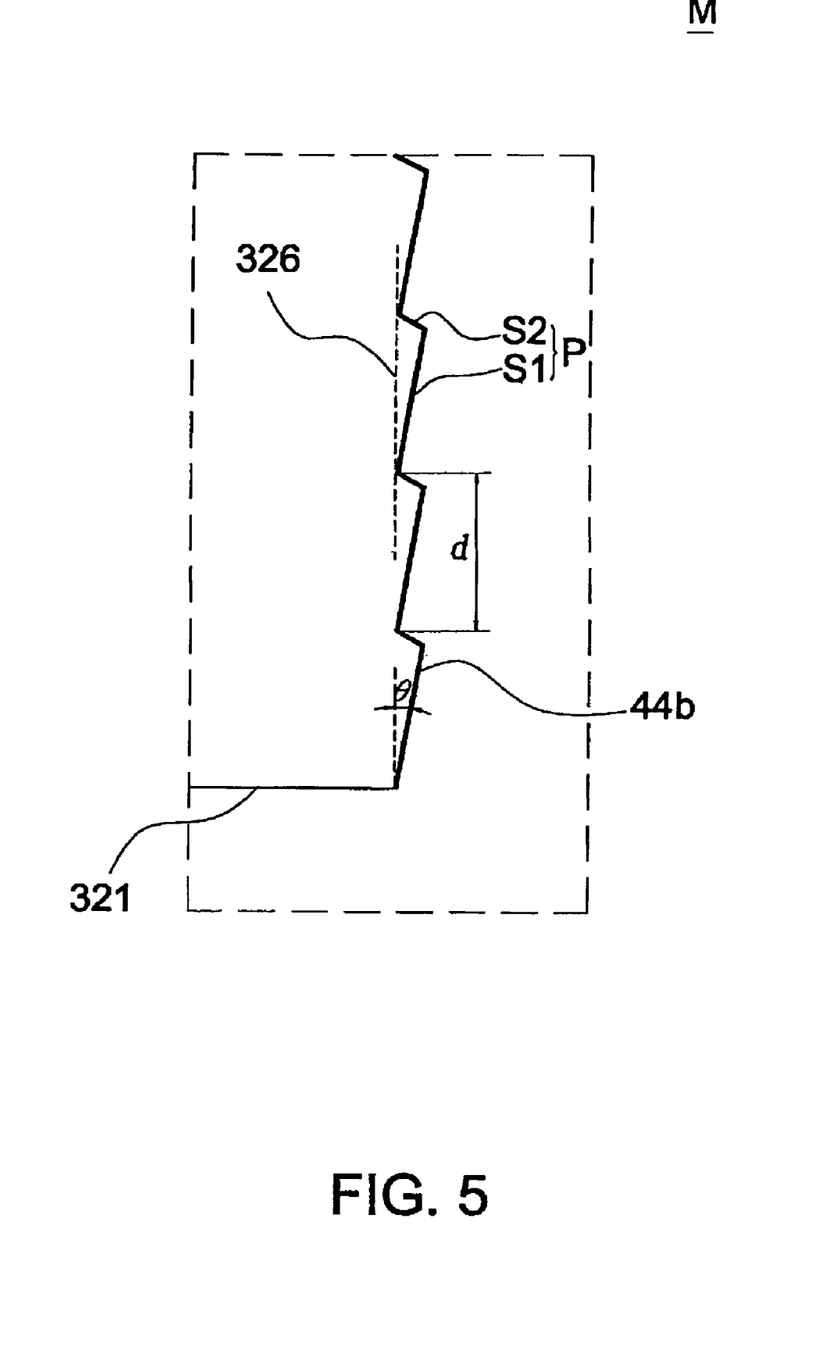
FIG. 5 is a part enlarged view of the light guide plate in an embodiment of the present invention.

The light guide plate 32 has a light incident surface 321, a light emitting surface 322, a bottom surface 323, a side surface 324 opposite to the light emitting surface 321, and two opposite side surfaces 325 and 326. The light emitting surface 322 is towards the liquid crystal display panel 20 and the bottom surface is opposite to the light emitting surface 322. The light incident surface 321 connects the light emitting surface 322 and the bottom surface 323 and the point light source 34 is disposed adjacent to the light incident surface 321. The side surface 324 connects the light emitting surface 322 and the bottom surface 323 and two opposite side surfaces 325 and 326 connect the light incident surface 321, the light emitting surface 322, the bottom surface 323, and the side surface 324. A microstructure 42 formed on the incident surface 312 provides light expansion effect for reducing the area of the light mixing region. The shape and the type of the microstructure 42 are not so limited and may need to provide light expansion effect. In addition, the microstructure 44a and the microstructure 44b are respectively formed on the two opposite side surfaces 325 and 326. The shape effect and the design effect of the microstructure 44 (including 44a and 44b) are illustrated as follows. FIG. 5 is a part enlarged view of the light guide plate in M region of FIG. 4. Referring to FIG. 5, in the embodiment, the microstructure 44b includes a plurality of pillars P protrusive from the side surface 326. Each of the pillars P has a first inclined plane S1 and a second inclined plane S2 connecting the first inclined plane S1, the light incident surface 321 is closer to the first inclined plane S1 than to the second inclined plane S2, the light incident surface 321 is farther from the second inclined plane S2 than to the first inclined plane S1, and the length of the first inclined plane S1 is greater than the length of the second inclined plane S2. In the embodiment, the angle θ between the first inclined plane S1 and the side surface 326 is great than or equal to 10 degrees and less than or equal to 30 degrees and the projection length d of each of the pillars P on the side surface 326 is great than or equal to 100 micrometers and less than or equal to 400 micrometers.

Figure 6:
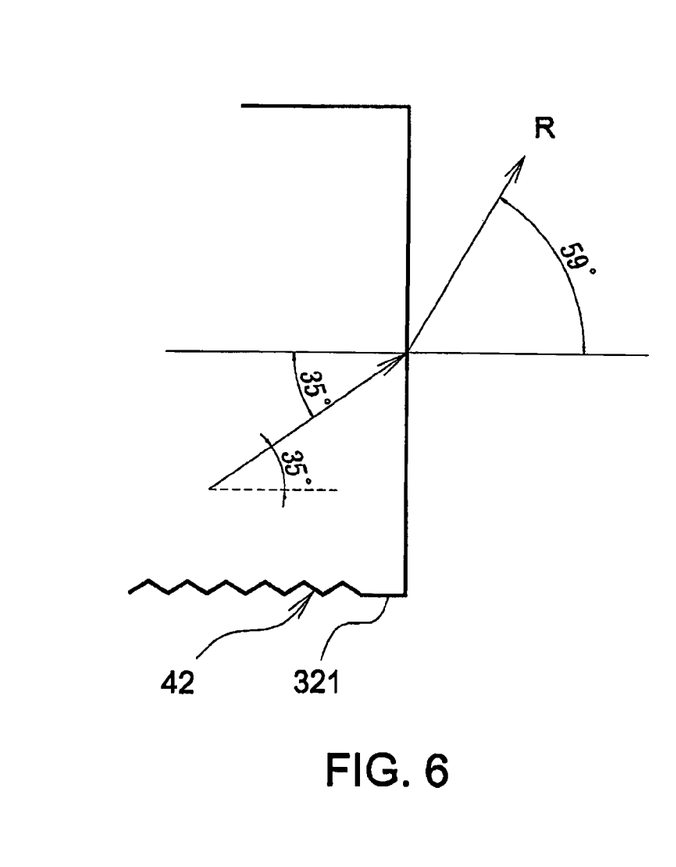
FIG. 6 is a schematic view of FIG. 7, illustrating the effect of disposing microstructures on a side surface of a light guide plate.
Figure 7:
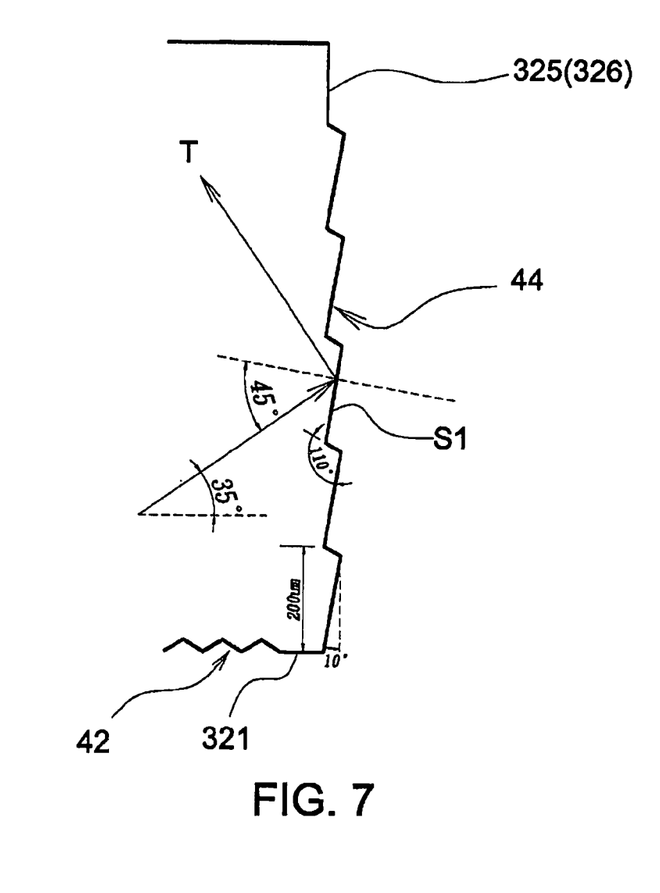

FIG. 6 is a schematic view of FIG. 7, illustrating the effect of disposing the microstructure 44 on the side surfaces 325 and 326 of the light guide plate 32. Referring to FIG. 6, the side light beam R through the microstructure 42 of the light incident surface 321 may have the large deflection angle, when the side light beam R having a large angle is incident into the side of the light guide plate 32, the side light beam R having the large angle is easily refracted out of the light guide plate 32, so as to form the side hot spot. However, referring to FIG. 7, the side surfaces 325 and 326 of the light guide plate 32 have the microstructure 44 respectively, when the side light beam T having the large angle deflected by the microstructure 42 is incident into the side of the light guide plate 32, the side light beam T having the large angle encountering the first inclined plane S1 of the microstructure 44 may satisfy total internal reflection condition and may be reflected into the light guide plate 32, so as to avoid refracting the side light beam T out of the light guide plate 32 and thus prevent forming the side hot spot. In addition, reflecting the side light beam T into the light guide plate 32 may enhance the light utilization efficiency.

Figure 8:
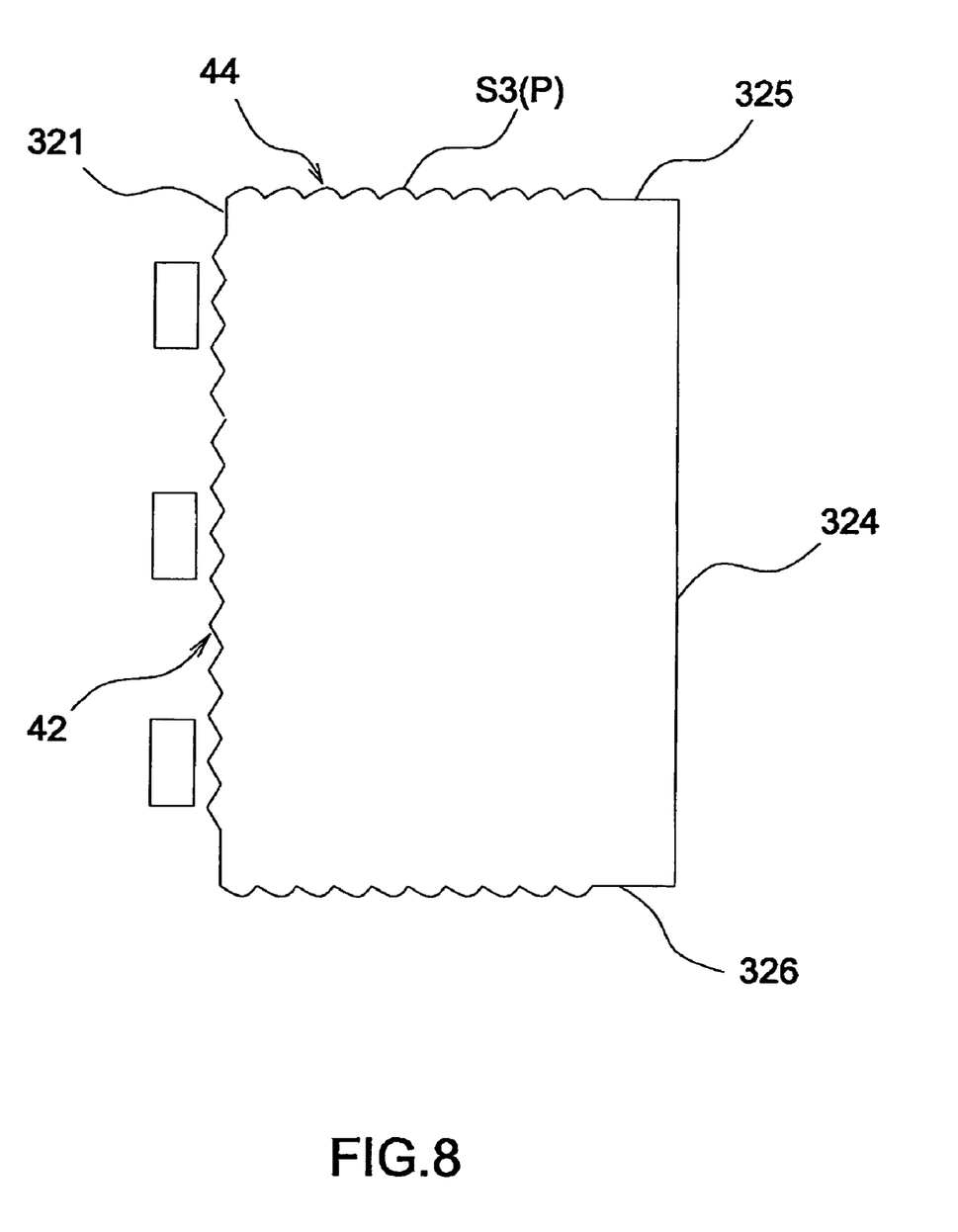
FIG. 8 is a schematic top view of the backlight module in another embodiment of the present invention.
Figure 9:
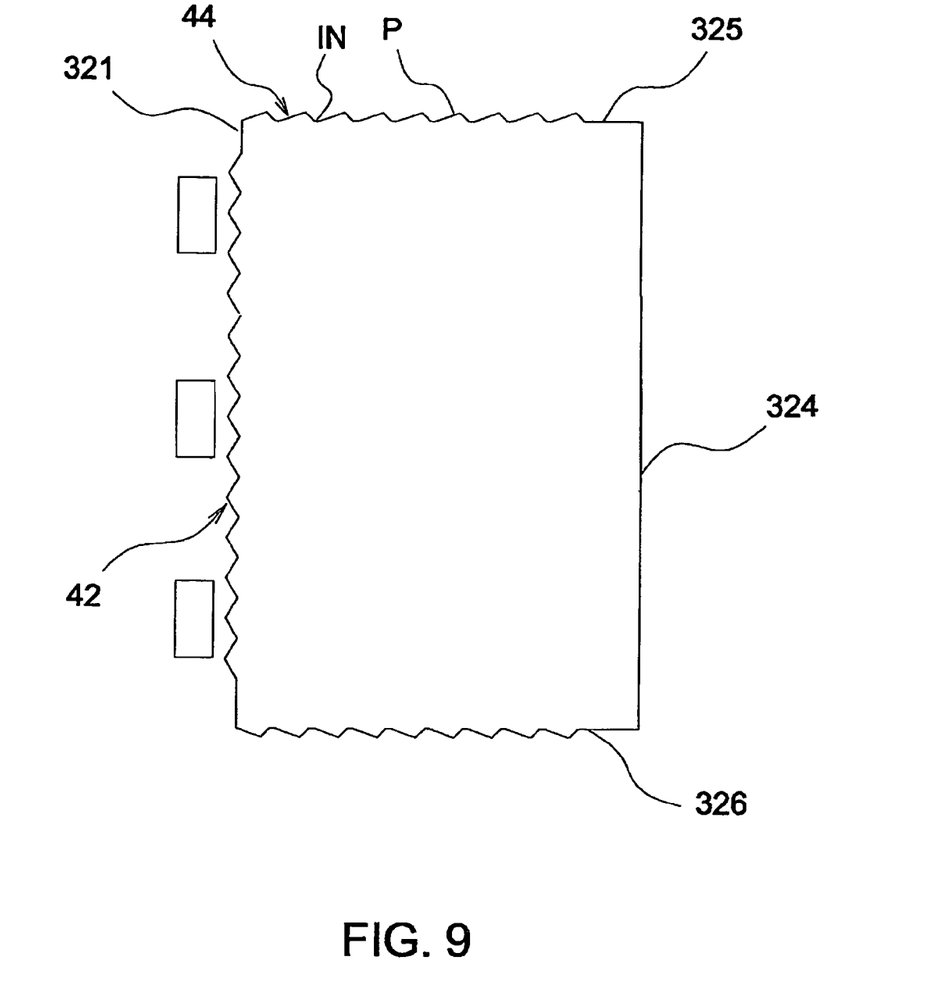
FIG. 9 is a schematic top view of the backlight module in another embodiment of the present invention.

Although the pillar P is a prism and the reflection surface S1 is an inclined plane in the above embodiment, which is not limited. Referring to FIG. 8, the reflection surface of the pillar P may be an arc surface S3 protrusive from the side surfaces 325 and 326, when the side light beam having the large angle deflected by the microstructure 42 is incident into the side of the light guide plate 32, the side light beam having the large angle encountering the arc surface S3 may satisfy total internal reflection condition and may be reflected into the light guide plate 32. Furthermore, the arrangement type of the microstructure 44 disposed on the side surfaces 325 and 326 is not limited, for example, the pillar P may be arranged in sequence on the side surfaces 325 and 326, or each two adjacent pillars P arranged on the side surfaces 325 and 326 may be not connected and may have a pitch IN (as shown in FIG. 9). In addition, the pillar P forming the microstructure 44 may be formed by directly cutting the side of the light guide plate 32 through using cutting method.

Referring to FIG. 3, the backlight module further includes a reflective sheet 36 and an optical film set 38. The reflective sheet 36 is disposed on the bottom surface 323 of the light guide plate 32 and the optical film set 38 is disposed on the light emitting surface 322 of the light guide plate 32 and disposed between the liquid crystal display panel 20 and the light guide plate 32. The optical film set 38 includes at least one of the diffusion plate, the prism plate or the brightness enhanced film (BEF). The reflective sheet 36 is used for reflecting the light beam emitting out of the light guide plate 32 into the light guide plate, so as to emit the light beam from the light emitting surface and thus form a surface light source for the liquid crystal display panel 20. The optical film set 38 is used for homogenizing the surface light source emitted from the light emitting surface 322 and is used for increasing brightness of the surface light source.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A backlight module, comprising:
   at least one point light source; and
   a light guide plate, comprising:
   a light emitting surface;
   a bottom surface, opposite to the light emitting surface;
   a light incident surface, connecting the light emitting surface and the bottom surface, wherein the point light source is disposed adjacent to the light incident surface;
   a first microstructure, formed on the light incident surface;
   a first side surface, opposite to the light incident surface, and connecting the light emitting surface and the bottom surface;
   a second side surface, connecting the light emitting surface, the bottom surface, the light incident surface, and the first side surface;
   a third side surface, opposite to the second side surface and connecting the light emitting surface, the bottom surface, the light incident surface, and the first side surface;
   a second microstructure, formed on the second side surface for reflecting a light beam incident on the second microstructure into the light guide plate so that the reflected light beam from the second side surface travels toward the first side surface and is reflected by the bottom surface toward the emitting surface, and
   a third microstructure, formed on the third side surface for reflecting a light beam incident on the third microstructure into the light guide plate so that the reflected light beam from the third side surface travels toward the first side surface and is reflected by the bottom surface toward the emitting surface,
   wherein each of the second microstructure and the third microstructure comprises a plurality of pillars protrusive from the second side surface and the third side surface respectively, each of the plurality of pillars has a first inclined plane and a second inclined plane connecting the first inclined plane, wherein the light incident surface is closer to the first inclined plane than to the second inclined plane, and the length of the first inclined plane is greater than the length of the second inclined plane.

2. The backlight module as claimed in claim 1, wherein the angle between the first inclined plane and the second side surface is greater than or equal to 10 degrees and less than or equal to 30 degrees.

3. The backlight module as claimed in claim 1, wherein the orthographic projection length of each of the pillars on the second side surface and the third surface is greater than or equal to 100 micrometers and less than or equal to 400 micrometers.

4. The backlight module as claimed in claim 1, wherein each of the pillars has an arc surface for reflecting a light beam incident on the arc surface into the light guide plate.

5. The backlight module as claimed in claim 1, wherein the pillars are arranged in sequence on the second side surface and the third surface, respectively.

6. The backlight module as claimed in claim 1, wherein each two adjacent pillars have a pitch.

7. The backlight module as claimed in claim 1, wherein the point light source is a light emitting diode.

8. A liquid crystal display, comprising:
   a liquid crystal display panel; and
   a backlight module, disposed at one side of the liquid crystal display panel and adapted to provide a surface light source for the liquid crystal display panel, wherein the backlight module comprises:
   at least one point light source; and
   a light guide plate, comprising:
   a light emitting surface;

a bottom surface, opposite to the light emitting surface;

a light incident surface, connecting the light emitting surface and the bottom surface, wherein the point light source is disposed adjacent to the light incident surface;

a first microstructure, formed on the light incident surface;

a first side surface, opposite to the light incident surface and connecting the light emitting surface and the bottom surface;

a second side surface, connecting the light emitting surface, the bottom surface, the light incident surface, and the first side surface;

a third side surface opposite to the second side surface, connecting the light emitting surface, the bottom surface, the light incident surface, and the first side surface;

a second microstructure, formed on the second side surface for reflecting a light beam incident on the second microstructure into the light guide plate, so that the reflected light beam from the second side surface travels toward the first side surface and is reflected by the bottom surface toward the emitting surface, and a third microstructure, formed on the third side surface for reflecting a light beam incident on the third microstructure into the light guide plate so that the reflected light beam from the third side surface travels toward the first side surface and is reflected by the bottom surface toward the emitting surface, wherein each of the second microstructure and the third microstructure comprises a plurality of pillars protrusive from the second side surface and the third side surface respectively, and wherein each of the plurality of pillars has a first inclined plane and a second inclined plane connecting the first inclined plane, the light incident surface is closer to the first inclined plane than to the second inclined plane, and the length of the first inclined plane is greater than the length of the second inclined plane.

9. The liquid crystal display as claimed in claim 8, wherein the angle between the first inclined plane and the second side surface is greater than or equal to 10 degrees and less than or equal to 30 degrees.

10. The liquid crystal display as claimed in claim 8, wherein the projection length of each of the pillars on the second side surface and the third side surface is greater than or equal to 100 micrometers and less than or equal to 400 micrometers.

11. The liquid crystal display as claimed in claim 8, wherein each of the pillars has an arc surface for reflecting a light beam incident on the arc surface into the light guide plate.

12. The liquid crystal display as claimed in claim 8, wherein the pillars are arranged in sequence on the second side surface and the third surface, respectively.

13. The liquid crystal display as claimed in claim 8, wherein each two adjacent pillars have a pitch.

14. The liquid crystal display as claimed in claim 8, wherein the point light source is a light emitting diode.

15. The liquid crystal display as claimed in claim 8, wherein the light guide plate is a wedge light guide plate or a flat light guide plate.

* * * * *